Patented July 16, 1946

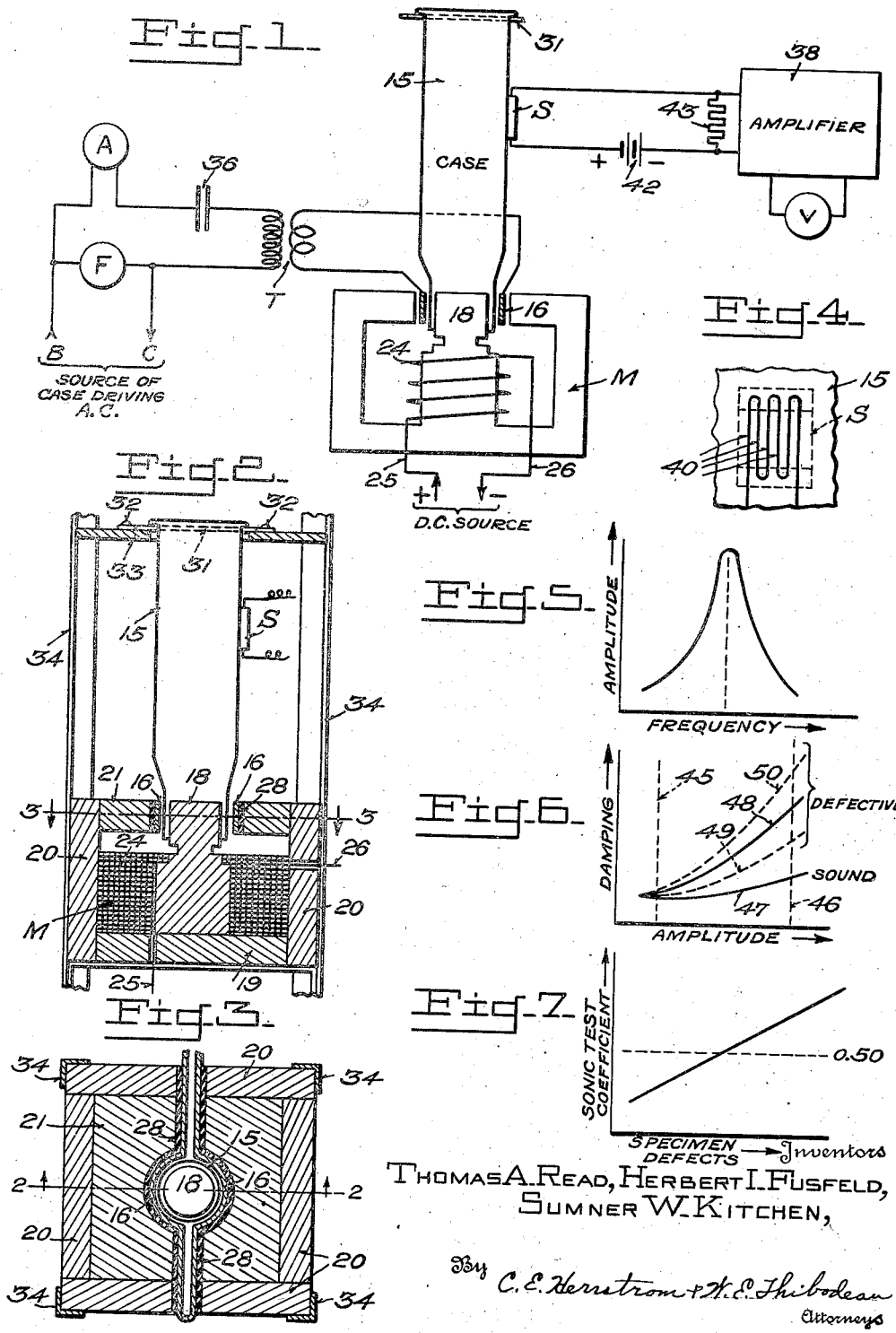

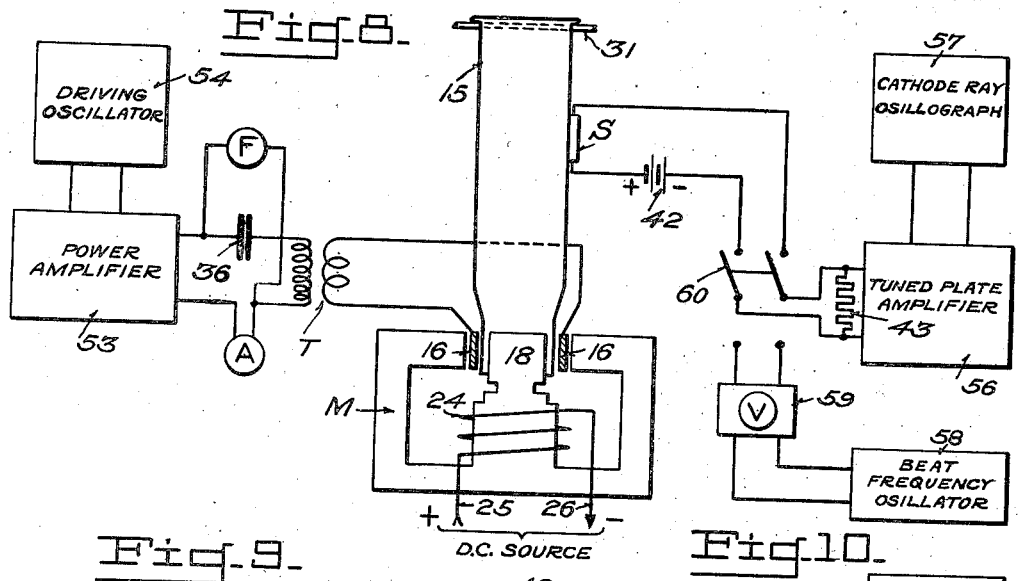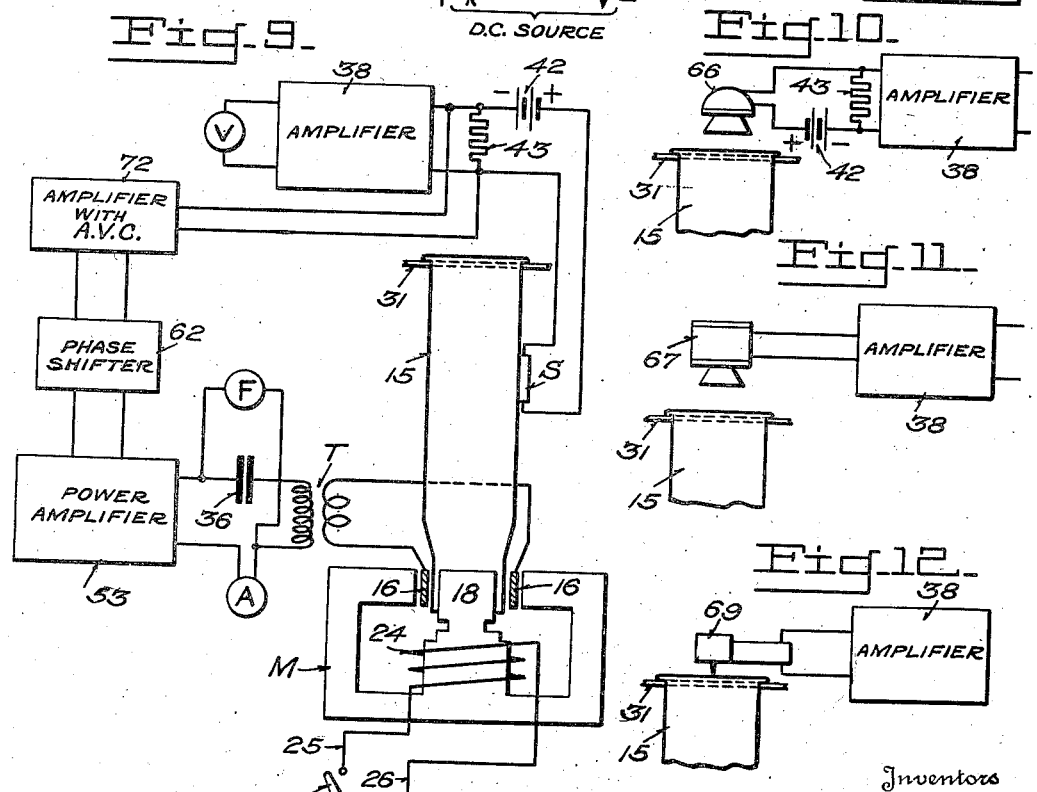

2,403,999

UNITED STATES PATENT OFFICE 2,403,999

SONIC METHOD FOR TESTING METAL

Thomas A. Read, Herbert I. Fusfeld, and Sumner W. Kitchen, Philadelphia, Pa.

Application February 22, 1944, Serial No. 523,430

4 Claims. (Cl. 73—69)

(Granted under the act of March 3, 1883, as amended April 30, 1928; 370 O. G. 757)

The invention described herein may be manufactured and used by or for the Government for governmental purposes without the payment to us of any royalty thereon.

Our invention relates to the testing of metals and it has particular reference to methods for detecting flaws, cracks and other defects in metal specimens.

Broadly stated, the object of our invention is to provide improved procedure by which the presence of internal flaws in metal specimens of various compositions and shapes may be detected positively, quickly and reliably.

A more specific object is to make special adaptation of our improved testing method to the examination of metal specimens which are cylindrical in shape and non-magnetic in character.

Another object is to provide a method of testing the brass cases of fired and other artillery cartridges for the presence of dangerous season cracks.

A further object is to provide a reliable test for the susceptibility of fired and resized cartridge cases to splitting or other fracture on subsequent refiring.

A still further object is to provide a test method by which it is possible prior to resizing to reject all cartridge cases which after being resized and reconditioned will crack on subsequent firing.

The improved metal testing method of our invention is predicated on our discovery that the "damping" characteristics of vibrated metal specimens will sharply reflect the presence of internal flaws if the specimen vibrations have such intensified amplitude as to set up in the metal peak stresses which are far higher than any heretofore employed by tests of the "sonic" character here considered.

In practicing our invention we attain the foregoing and other objects by exciting the metal specimen to longitudinal vibration at its natural or resonant frequency; by so building up the amplitude of this resonant vibration that the peak stress thereby induced in the metal has an exceedingly high intensity (of the order of five to ten thousand pounds per square inch for brass cartridge case metal); by measuring the damping capacity (i. e. the internal friction) at this high amplitude of vibration; and by comparing the observed measurement with known standards for purposes of classifying the metal in the specimen either as sound or as defective.

Illustrative embodiments of our improved testing method and of apparatus suitable for practicing same are shown by the accompanying drawings wherein:

Fig. 1 is a diagrammatic showing of brass cartridge case testing equipment which incorporates the principles of this invention;

Fig. 2 is an enlarged section view showing preferred mechanical constructions for Fig. 1's case support and driving magnet;

Fig. 3 is a horizontal section on line 3—3 through the top plate and circular air gap of the driving magnet of Fig. 2;

Fig. 4 is a showing of further details of the strain gauge which is attached to the test specimen side;

Figs. 5, 6 and 7 are curves illustrative of certain principles upon which our improved test method is based;

Fig. 8 illustrates alternative forms which Fig. 1's case driving source and amplitude measuring means may take;

Fig. 9 shows further variations of the basic system of Fig. 1; and

Figs. 10, 11 and 12 show alternative arrangements by which the amplitude of case vibration may be registered and measured.

THE TESTING APPARATUS OF FIGS. 1-2-3-4

In Fig. 1 we have shown our improved testing facilities as organized for detecting the presence of flaws in a brass cartridge case 15. For clarifying the description to follow it will be assumed that this case is designed for use in a 75 mm. artillery piece. As the description proceeds it will become evident that other sizes and shapes of cartridge cases may be tested with equal facility, and that metal specimens of compositions other than brass and of shapes and contours other than represented at 15 likewise lend themselves to test by our improved flaw detecting method herein disclosed.

Essential elements of the equipment shown in Fig. 1 include: (a) a case vibrating magnet M; (b) a source B—C of alternating current power for energizing a driving winding 16 of the magnet; (c) apparatus including a strain gauge S for measuring the amplitude of vibration that is induced in the test case 15; and (d) current and voltage measuring instruments A and V for giving the ratio of the driving power input to the strain gauge output.

THE CASE DRIVING MAGNET

The case driving magnet M has the construction best shown in Figs. 2-3. A central core 18 of magnetically soft iron is fastened to a lower plate 19 of the same material and substantially square in shape. Extending upwardly from each of the four edges of this lower plate are side plates 20, also of magnetic iron. Fitted into the square opening formed by the upper edges of these side plates is an iron top plate 21 having in its center a round opening somewhat larger than the top of the central core 18.

The annular space between magnet core 18 and the surrounding plate metal 21 constitutes an air gap through which a direct current winding 24 causes to flow unidirectional magnetic flux from the central core 18 in all radial directions to the surrounding top plate 21. This core winding 24 is continuously excited by any suitable source of direct current, designated in Fig. 1 by the terminal "+" and "—." Energizing leads 25—26 are brought from winding 24 to the outside of magnet M in any suitable manner such as that indicated in Fig. 2.

The outside diameter of the magnet's central core 18 is slightly less than the inside mouth diameter of the cartridge case 15 to be tested, while the inside diameter of the central opening in the magnet's top plate 21 is somewhat larger than the mouth diameter of the same case. This permits the case mouth to fit down into the magnet's annular gap in a manner clearly indicated by Figs. 1-2-3 and to a depth of slightly over 1½ inches. In this position there is passed through the case mouth metal the radial magnetic flux earlier referred to as being set up by direct current winding 24. Preferably this unidirectional magnetic force has an intensity of the order of 10,000 oersteds.

Positioned between the case mouth metal and the magnet plate metal 21 is the alternating current driving winding 16 earlier mentioned. Preferably this winding takes the form of the represented single turn of copper strip secured inside the opening in plate 21 in any suitable manner such as shown in Figs. 2-3. There thin layers of insulation 28 separate the copper strip 16 from the plate metal and at the same time mechanically support the strip through a bonding thereof to the metal 21.

For holding the cartridge case 15 in the represented test position use may be made of any suitable means which impart mechanical support without interfering with case vibration. Such means may take the form of a support plate 33 held at suitable distance above the top of magnet M by corner uprights 34 and having a central opening somewhat larger than the outside diameter of the cartridge case 15. Two or more strands of piano wire 31 are stretched at moderate tension across this opening between securing screws 32. By restraining downward movement of the case head rim, these wires 31 mechanically suspend the case in the test position represented.

SUPPLY OF CASE DRIVING ENERGY

For causing the just described magnet M to drive the cartridge case 15 at its natural rate of vibration use is made of the facilities which the left portion of Fig. 1 represents. These facilities include the earlier named source B—C of alternating current power plus a step down transformer T, a capacitor 36, the earlier mentioned ammeter A and a frequency meter F.

Source B—C may take any suitable form capable of supplying up to about one kilowatt of power at a frequency which exactly matches the natural or resonant rate of longitudinal vibration for the cartridge case 15. Cases of the 75 mm. size here described are found to have a natural vibration frequency of the order of about four thousand cycles per second, and in conducting tests on such cases source B—C thus should be capable of supplying case driving energy at four thousand cycles per second and further be adjustable through one or two hundred cycles above and below the stated value. The utility of this adjustment will become further evident as the description proceeds.

The step down transformer T is for the purpose of converting alternating current energy of the moderate-voltage potential readily available at source B—C into energy of the lowered voltage and relatively high amperage which is required for satisfactory operation of the case driving magnet M. In one design which has proven satisfactory this transformer makes use of a primary having 88 turns of No. 18 wire wound in two layers on an insulating tube about 8 inches in diameter, and having a secondary made up of a single copper strip 2 inches wide by .020 inch thick wound as a single turn around the same tube. The particular transformer used is of the air core type.

This copper strip of 2 inches by .020 inch cross section is, in the test equipment now described, continued from the transformer T into the air gap of the driving magnet M where it constitutes the single turn driving winding shown at 16 in Figs. 2-3. For producing cartridge case vibrations of the elevated order required by our test method currents of the order of several hundred amperes are supplied by the secondary of this transformer T.

The load thus presented to the power source B—C is found to be predominantly inductive, and without corrective means results in an objectionably low power factor. To compensate for this use is made of a capacitor 36 series connected in the transformer primary circuit as shown in Fig. 1. By choosing the capacitive reactance of element 36 to equal the inductive reactance of transformer T and its connected load, the power factor of energy drawn from the alternating current source B—C may be made substantially unity. Under these conditions the driving magnet M is observed to impose a load on the source B—C which approximates a pure resistance of about 12 ohms.

The described magnet M and energizing sources therefor constitute an "eddy current" metal drive by which there is exerted on the case mouth mechanical forces which alternately act upwardly and downwardly. This action results from the fact that the alternating current in the driving winding 16 induces corresponding eddy currents in the case mouth metal. The interaction of these induced eddy currents with the radially-flowing unidirectional magnetic flux produces on the case mouth metal an alternating mechanical force which is directed along the axis of this case.

This alternating mechanical force reverses its direction in step with the frequency of the current from driving source B—C, and when the frequency thereof is chosen to match the test case's natural frequency of vibration there may be produced in the case longitudinal vibrations of the extremely elevated magnitude which the test method of our invention requires.

Since the case driving forces are directed alternately in opposite directions at a frequency having the stated value of around four thousand cycles per second, the average force of each of these complete cycles is zero and this makes it possible to support the case in a position in the magnet gap by the light wires indicated at 31 in engagement with the rim at the head of the case.

THE AMPLITUDE MEASURING MEANS

For measuring the amplitude of the mechanical vibrations thus induced in the test case 15 use is made of the earlier named strain gauge S plus an amplifier 38 plus the earlier named voltmeter V.

As is more clearly shown in Fig. 4, the strain gauge S consists of a series of back and forth loops of electrical resistance wire 40 mechanically bonded together by suitable insulating material and further bonded to the wall side of the cartridge case 15 under test. As a result of this bonding any change in the length of the test metal 15 produces a corresponding change in the mechanical length of the gauge loops 40.

These loops are connected in series and the resistance variations of each which accompany changes in its effective length are additively combined to give a total resistance change which lends itself to ready measurement or detection. Strain gauges of the type shown at S are commercially available, and one design found especially suitable has a static resistance of 500 ohms and a strain sensitivity of 3.5. By strain sensitivity is meant the ratio of the fractional change in resistance of the gauge to the fractional change in gauge length.

For most effective response to longitudinal vibration of the test case 15 the strain gauge S should be attached at some intermediate point between the two case ends, such as is shown in Figs. 1-2. This particular location was selected after experimentation which showed that in longitudinal vibrations of the character here considered the effect is analogous to simple compression and stretching from the two case ends. This results in a point known as the displacement "node," at which mechanical movement of the case divides and further at which there is no change of mechanical position.

For cartridge cases of the 75 mm. design shown, this point is approximately one-third of the case length distance from the head end. Mounting of the strain gauge S at this point results in the maximum movement between the two gauge ends; and while other positions are found also to give indications of the case vibration amplitude their effect is relatively less than the nodal point mounting here shown.

For converting variations in strain gauge resistance into corresponding variations in potential, use is made of a battery or other direct current source 42 of constant potential connected through the strain gauge loops 40 in series with a resistor 43.

As long as the strain gauge remains static the current flow through resistor 43 is constant and the voltage appearing thereacross remains unchanged. Each decrease in strain gauge resistance which accompanies an effective compression of the cartridge case 15 raises the resistor current and produces a corresponding rise in voltage between the resistor terminals. Similarly, each increase in strain gauge resistance which accompanies an effective stretching of the test case 15 produces a corresponding drop in resistor current and a resultant lowering of the resistor terminal voltage.

The magnitude of these changes in resistor voltage is relatively small and in order to increase it to such an extent as to make ready measurement possible use is made of the amplifier 38. This amplifier may be any one of a number of commercially available forms, and for this reason no attempt to show details has been made.

Exciting its input terminals is the potential appearing across the resistor 43. Each change therein is magnified many times by the amplifier and impressed upon a suitable measuring device indicated as voltmeter V.

When appropriately calibrated, this voltmeter can thus be made to yield a direct indication of the amplitude at which the cartridge case 15 is being vibrated during practice of the improved test method of our invention. Conveniently this indication may be in terms of the millivolts of potential which appear across resistor 43, and in connection with certain test data later presented use is made of a voltmeter indication expressed in such terms.

The combination just described is thus so organized that complete absence of vibration on the part of the test case 15 will cause meter V to give what may be termed a "zero" indication; that vibration of moderate amplitude on the part of case 15 will produce an intermediate reading by voltmeter V; and that vibration of high amplitude by case 15 will produce a correspondingly high reading by the voltmeter.

OPERATION OF THE FIG. 1 TEST EQUIPMENT

In applying the just described test equipment of Fig. 1 to fired 75 mm. brass cartridge cases we are able to predetermine with high accuracy all of those cases in the tested group which will rupture upon resizing, reloading and subsequent firing, and which of the cases in the group will withstand the refiring without rupture or other failure of the case metal.

The need for such determination has been felt in a practical way for a long time. Splits which have been obtained in the firing of resized brass cases are now ascribed to the presence of season cracks. These cracks are caused by the attacks of the products of the burning of the propellant powder during the period between the firing of the round and the cleaning of the case.

Such cleaning is subject to considerable delay by reason of the fact that in many instances the cases lay out in the field exposed to weather for long periods of time after their original firing, and when subsequently subjected to resizing operations preparatory to a second use there frequently have developed minute cracks, particularly on the side wall interiors.

These are so inconspicuous and difficult to detect that they go completely unnoticed through the entire sequence of resizing operations and are only discovered upon refiring of the case, when their presence then results in longitudinal splits or other failure of the case. Such failures not only endanger personnel firing the weapon but by reason of loss in chamber pressure they so alter the ballistic performance of the fired projectile that aiming becomes inaccurate and unreliable. In addition the escaping gases erode the weapon's chamber and firing pin causing early malfunction of the weapon.

Until the advent of our invention, no method was available for reliably separating the good from the bad prior to case resizing or at any time prior to case reuse. With our method, however, the desired selection can be made quickly, reliably and effectively.

In using the earlier described equipment of Fig. 1 each of the cartridge cases to be tested is subjected to only two preparatory operations. The primer is punched out of the case head, and the mouth of the case is restored substantially to its original circular shape.

So prepared the case then is lowered through the opening in the support plate 33 (see Fig. 2) to the represented position where the wall metal of the case mouth fits into the annular gap of the driving magnet M and is there supported by a resting of the case head rim on the supporting wires 31. The strain gauge S is now attached to the case side wall at the location between the two ends of the case determined as earlier described.

Direct current is now applied to the magnet M's central core winding 24, and alternating current from source B—C is applied to transformer T and thence to the case driving winding 16. This direct current supply is adjusted to a value predetermined as suitable for the test and which yields the required intensity of uni-directional flux in the circular gap surrounding the magnet's central core head 18.

The frequency of the alternating current from source B—C is, by the aid of meter F, roughly adjusted to what is expected will match the resonant frequency of vibration for the case 15. An observation at meter V of the resulting amplitude of case vibration is taken, and holding the case driving current as shown by meter A at a constant value, the frequency of the alternating driving current is varied in small steps in both directions until the amplitude meter V shows a maximum reading.

This maximum indicates that the frequency of the alternating driving current now exactly matches the resonant frequency of vibration for the test case 15. This indication follows from the well known resonance curve illustrated in Fig. 5 which shows how the test case 15 responds in vibration amplitude to driving current frequencies above and below the resonant value which the dotted vertical line designates.

Explanation has already been given of how the eddy currents induced in the case mouth metal interact with the uni-directional flux flowing through that metal to set up in the metal mechanical forces which alternately act upwardly and downwardly in step with the reversals of current induced in the case mouth metal. At frequencies of the order of four thousand cycles per second the duration of each of these forces is extremely short. Each upwardly acting force pulse tends to compress the side wall metal above the case mouth, while each downwardly acting force tends to stretch or elongate it.

The inertia of the total case mass prevents the complete case from following these pulsations, and even though applied at one end only their effect is to set up longitudinal vibrations toward and away from an intermediate "nodal" point along the case length. Were both ends of a simple cylindrical test specimen to be open this point would be substantially midway. Closure of the top end by the case head shifts this neutral point upwardly to about two-thirds of the total distance from the case mouth.

Our observations show that at resonant frequency for the case each compressive action in the case side wall below the nodal point is accompanied by a similar compressive action in the case side wall above the nodal point; likewise, that each side wall stretch or elongation below the nodal point is also accompanied by corresponding elongation in the side wall metal above the nodal point.

During resonant vibration, therefore, a simple "bellows" action takes place wherein the case metal at the nodal point and on both sides thereof (with the exception of the case extremities) alternately shortens under compression and lengthens under tension. Although the nodal point completely lacks longitudinal motion, some transverse expansion and contraction of the case circumference appears there to be present.

For the relatively low intensities of induced case vibration which have heretofore been used in attempting to test material specimens, it is observed that a defective specimen exhibits practically the same "damping" capacity as does a sound specimen. In the curve of Fig. 6 such relatively low vibration amplitudes are indicated by the vertical line 45, and typically they have resulted in peak stresses in the test metal of the order of five hundred pounds per square inch or lower.

We have discovered that when the amplitude of the longitudinal test case vibrations is increased to a substantially higher value, such as is designated at 46 in Fig. 6, a defective case will show a substantially higher damping than does a sound case. By damping is meant the internal friction of the case metal, and one convenient measure thereof is given by the ratio of the case driving force to the resulting vibration amplitude as indicated through the strain gauge S by Fig. 1's voltmeter V. During the remainder of this description a quantity proportional to that ratio will be designated as the "sonic test coefficient."

Observations made by us show that a sound test specimen has a damping-amplitude curve of the relatively flat character shown at 47 in Fig. 6; that specimen metal having defects of moderate quantity has a relatively steeper curve such as is shown at 48; that the presence of fewer defects causes the curve to be less steep, as shown at 49; and that defects present in larger number result in a curve of the greater steepness shown at 50.

Accordingly, in operating the Fig. 1 equipment the driving current supplied from source B—C to the magnet winding 16 is next increased to such an extent that the resulting resonant vibration of the test case 15 rises to an amplitude of the high order shown at 46 in Fig. 6.

That high order amplitude is known to be attained when meter V gives a reading corresponding to about 12 millivolts input to the amplifier. It is accompanied by peak stresses in the case metal of the order of from five to ten thousand pounds per square inch. Correlation of the readings of meter V with such stresses can be made in any one of a number of manners so well known to the metals testing art that description at this point is deemed unnecessary.

At these high stress amplitudes of longitudinal vibration there is a relatively wide variation in the damping capacities of sound and defective cartridge cases. As Fig. 6 indicates, the greater the defects the higher the damping and hence the more driving force that is required to induce the high vibration amplitude.

Since for a given vibration amplitude there is a more or less direct relation between the specimen damping and the driving power requirements, those cartridge cases which are defective require considerably more power from driving source B—C than do cases which are sound. One measure of this power is the reading of ammeter A. It is found that the impedance of the case driving circuit remains substantially constant regardless of whether the case is sound or defective, and for this reason the reading of ammeter A may be assumed to be directly proportional to the driving power input.

ANALYSIS OF TEST RESULTS

In order that some variation in the values of test vibration amplitude may be permitted, we prefer to analyze comparative test results through a ratio earlier termed as the "sonic test coefficient." This coefficient is the quotient of the ampere current reading by meter A to the millivolt potential appearing across resistor 43 as read by meter V. For test system constants having one particular set of values, new or sound cases exhibit a coefficient value of approximately 0.30; fired cases having defect contents within tolerances acceptable for refiring show coefficients of 0.50 and below; and fired cases having defects sufficient to cause rupture after resizing and subsequent firing have test coefficients above 0.50.

This relation is best indicated by the curve of Fig. 7 wherein the horizontal dotted line indicates the point at which acceptable cases should be separated from unacceptable ones on the basis of proven test results.

One set of data which establishes the foregoing sonic test correlation is presented by the accompanying Table X.

TABLE X

*Sonic test correlation*

| Case | Sonic test coefficient | Firing result | Case | Sonic test coefficient | Firing result |
|---|---|---|---|---|---|
| 161 | 0.368 | 0 | 202 | 0.760 | $x$ |
| 166 | .400 | 0 | 200 | .778 | 0 |
| 108 | .400 | 0 | 102 | .779 | 0 |
| 79 | .417 | 0 | 127 | .784 | $x$ |
| 116 | .433 | 0 | 115 | .796 | + |
| 158 | .437 | 0 | 204 | .800 | $x$ |
| 205 | .442 | 0 | 64 | .804 | $x$ |
| 153 | .450 | 0 | 169 | .825 | 0 |
| 117 | .450 | 0 | 137 | .842 | $x$ |
| 7C | .451 | 0 | 150 | .847 | $x$ |
| 159 | .460 | 0 | 129 | .850 | $x$ |
| 111 | .467 | 0 | 160 | .886 | + |
| 100 | .468 | 0 | 66 | .888 | $x$ |
| 131 | .500 | 0 | 62 | .919 | $x+$ |
| 165 | .500 | 0 | 77 | .933 | + |
| 171 | .516 | 0 | 67 | .940 | $x$ |
| 106 | .544 | 0 | 125 | .952 | $x+$ |
| 120 | .550 | $x$ | 141 | .955 | $x$ |
| 101 | .568 | $x$ | 172 | .989 | + |
| 151 | .577 | $x$ | 206 | .990 | 0 |
| 103 | .591 | 0 | 121 | 1.02 | $x$ |
| 201 | .592 | 0 | 126 | 1.14 | $x+$ |
| 208 | .616 | $x$ | 136 | 1.32 | $x+$ |
| 162 | .636 | 0 | 140 | 1.33 | $x$ |
| 74 | .650 | $x$ | 122 | 1.35 | $x$ |
| 119 | .651 | 0 | 173 | 1.37 | 0 |
| 170 | .659 | 0 | 134 | 1.38 | $x$ |
| 112 | .660 | 0 | 130 | 1.44 | + |
| 71 | .661 | $x$ | 138 | 1.50 | $x$ |
| 73 | .666 | + | 139 | 1.60 | $x$ |
| 167 | .668 | 0 | 132 | 1.60 | $x$ |
| 164 | .676 | $x$ | 135 | 1.64 | $x+$ |
| 81 | .679 | + | 168 | 2.00 | $x+$ |
| 156 | .685 | $x$ | 114 | 2.35 | + |
| 203 | .705 | 0 | 72 | 2.66 | $x+$ |
| 133 | .708 | 0 | 68 | 4.00 | $x+$ |
| 157 | .728 | $x+$ | 70 | 5.34 | $x+$ |
| 123 | .754 | $x$ | | | |

0—No defect.
$x$—Longitudinal crack.
+—Transverse rupture.

The seventy-five fired brass cartridge cases of 75 mm. size which are identified under the "case" column were examined for the presence of season cracks by our improved sonic test method. This examination gave the "sonic test coefficients" which Table X lists. These cases were then fired at 12% excess pressure in a 75 mm. weapon having a worn chamber. 53% of the cases split. None of the cases with a sonic test coefficient less than 0.55 split. All but one of those with the coefficient above 1.00 failed during firing.

This data shows an excellent correlation between the sonic test coefficient and the incidence of firing splits. The high percentage of splits in the group was a result of its selected components for it was expected that most of the cases with a coefficient above 0.50 would split.

THE MODIFIED TEST SYSTEM OF FIG. 8

In Fig. 8 we have represented alternative forms of case driving power supply and of vibration amplitude measuring means. These differ from the corresponding elements earlier described in connection with Fig. 1 in the manners now to be pointed out.

Look first at the case driving power supply means of Fig. 8, it makes use of a power amplifier 53 and a driving oscillator 54. This oscillator must be capable of generating a frequency which matches the resonant vibration frequency of the test case 15 and should in addition be adjustable through a small range on either side of the resonant value. It feeds into the power amplifier 53.

This power amplifier 53 corresponds to the source B—C of Fig. 1 and should have an output capacity of approximately one kilowatt; in energizing transformer T it performs exactly the same function as does the Fig. 1 source.

In this Fig. 8 arrangement adjustment of the power driving frequency, as measured at meter F, is effected at the driving oscillator, while adjustment of the driving power current, as measured by meter A, is effected at the power amplifier. Both of these adjustments are manual and are made to meet the requirements earlier described in connection with Fig. 1.

Looking next at the frequency amplitude measuring means of Fig. 8, these employ a tuned-plate amplifier 56, a cathode ray oscillograph 57, a beat frequency oscillator 58, a potential comparing device 59 and a transfer switch 60.

In order to obtain an amplitude measurement for the vibrating case 15, switch 60 is first thrown to the upward position wherein its output circuit feeds into resistor 43 and the tuned-plate amplifier 56. That amplifier is manually adjusted for the resonant case frequency, and under these conditions it functions to magnify the voltage fluctuations across resistor 43 which the strain gauge S produces.

So magnified, these fluctuations are transmitted to the cathode ray oscillograph 57 where they cause to be traced on the oscillograph screen (not shown) a visual showing of the case vibration wave form and amplitude. In the system of Fig. 1 only the latter quantity can be indicated. The former occasionally is of value and can be provided by the Fig. 8 arrangement.

The amplitude of the case vibration wave having been noted on oscillograph 57, transfer switch 60 is shifted to the downward position where the amplifier 56 has transmitted thereto "comparison" oscillations from the beat frequency oscillator 58. This oscillator is manually adjusted to the resonant frequency of the test case 15 and it causes oscillograph 57 to trace a wave of the same frequency as is present in case 15.

The amplitude of this wave as show by the oscillograph may be varied by device 59. Adjustment from that device is now so made that the wave traced by oscillograph 57 has the same amplitude as did the wave there traced when amplifier 56 was connected with the strain gauge S.

Under these "matched wave" conditions the voltage reading at indicator V of the comparing device 59 is now noted. This reading corresponds to that directly obtained by voltmeter V in the organization of Fig. 1.

For purposes of computing "sonic test coefficients" the modified organization of Fig. 8 thus is the full equivalent of the basic organization shown in Fig. 1.

THE REGENERATIVE ORGANIZATION OF FIG. 9

It has been seen that Fig. 8's driving power supply facilities require that the frequency of the supplied driving power be adjusted at oscillator 54 to match the resonant frequency of the tested case 15. The need for such manual adjustment may be dispensed with through use of driving power equipment organized as shown in Fig. 9.

There Fig. 8's driving oscillator 54 is replaced by a phase shifting network 62. The input terminals of this network are directly connected with the output terminals of an amplifier 72 having automatic volume control, while the output terminals of phase shifter 62 lead directly to the input terminals of power amplifier 53.

The power amplifier 53 of Fig. 9 corresponds to the similarly identified amplifier of Fig. 8 and constitutes the source of alternating current drive energy impressed upon transformer T and thereby transmitted to the driving winding 16 of magnet M. The strain gauge amplifier 38 of Fig. 9, in turn, corresponds in all respect to the similarly marked amplifier of Fig. 1 and indicates the strain gauge output at meter V.

In operation of the Fig. 9 system, each vibration of the tested case 15 varies the resistance of strain gauge S, produces a corresponding change in the voltage across resistor 43, causes an amplified measure of this change to appear at the output terminals of amplifier 72 and hence at the input terminals of phase shifter 62. There such displacement and timing is introduced as proves most effective for exciting the power amplifier 53. Since this excitation is in the form of pulsations which recur at the case's resonant frequency, the cycles of case vibration once set up are self-propagating through a feed back or regenerative action.

Once, started, this action continues indefinitely and it automatically adjusts the frequency of the case driving voltage from amplifier 53 to an exact matching relation with the resonant frequency of the vibrated case 15.

In order to start this regenerative vibration control, it is merely necessary to set up some electrical or mechanical disturbance, such as closure of a switch 64 in the supply circuit for the magnet's direct current winding 24. Once the sequence of regenerative actions above discussed, has been started, these actions continue until some break is made in the power supply or feed back circuits.

The automatic volume control desired in amplifier 72 is such that oscillation of the system in the manner described above is possible when the sonic test coefficent of the cartridge case is substantially above the acceptance value; it further is such that the amplitude of oscillation is successively greater for cases of lower sonic test coefficients until the maximum permissible power from amplifier 53 is attained for a case with a test coefficient below the acceptance value, such as 0.30.

THE ALTERNATE AMPLITUDE INDICATORS OF FIGS. 10-11-12

In all of the thus far shown arrangements for indicating vibration amplitude, use has been made of the strain gauge S earlier described as being mechanically attached to the case side wall and varying its resistance in step with the elongations and contractions of the side wall metal. While exceedingly satisfactory such a strain gauge is not, however, the only device which lends itself to registration of amplitude measurements.

During its vibration, a 75 mm. case emits a highly audible sound, and the intensity of this sound has been observed to vary in direct proportion to the amplitude of the vibration. In the arrangement of Fig. 10 advantage of this fact is taken by the use of a microphone 66 placed to receive the sound waves induced by the longitudinal vibrating movements of the case.

This microphone 66 may be of the conventional carbon-granule type used in commercial telephones, or the condenser type used in radio broadcasting, in which case it sets up resistance variations analogous to those produced by the strain gauge S. This similarity makes possible a direct substitution in the electrical circuits of Fig. 1, for example, of the microphone 66 for the strain gauge S and results in the apparatus organization which Fig. 10 shows.

The organization of Fig. 10 employs battery 42 in the same manner as does the strain gauge S of the earlier views. It is possible to eliminate this battery by employing a dynamic type of microphone in the manner shown at 67 in Fig. 11. Such a device generates its own potential and for this reason is suitable for directly exciting the amplifier 38 without recourse to the earlier shown battery 42 and resistor 43.

Fig. 12 shows a further arrangement for converting the case vibrations into amplitude proportional changes in potential and supplying that potential to amplifier 38. In Fig. 12 use is made of an electrical pick up device 69 analogous to that used in phonographs. Such a device 69 also generates its own voltage and hence is suitable for direct connecting to the input terminals of amplifier 38.

It should be pointed out that test specimens which vibrate at above the audible sound range may also have their vibration amplitudes detected by the just described apparatus of Figs. 10-11-12.

SUMMARY

From the foregoing it will be seen that we have provided improved procedure by which the presence of internal flaws in metal specimens may be detected reliably, quickly and easily; that we have made special provision for examining metal specimens which are cylindrical in shape; that we have provided a method for testing the brass cases of fired artillery cartridges for the presence of dangerous season cracks; that we have developed a reliable test for the susceptibility of fired and resized cartridge cases to splitting on subsequent firing; and that we have perfected a test method by which it is possible prior to resizing to reject all cases which after being resized and reconditioned will fracture on firing.

The testing apparatus for 75 mm. cartridge cases which we have shown by way of illustration may with very slight modification be adapted to the testing of artillery cartridge cases of other sizes and forms. Such adaptation consists in selecting mechanical dimensions of the case supporting frame and the driving magnet M to accommodate the particular size of cartridge case desired to be tested, and in choosing electrical characteristics of the driving power supply and vibration measuring facilities which are appropriate for the selected case size.

Our improved sonic testing method further lends itself to use with metal specimens other than cartridge cases and may with comparable success be applied to the detection of internal flaws in cylindrical specimens which are open at both ends.

Nor are cylindrical specimens the only type which can be tested, for upon the making of modifications immediately apparent to those skilled in the art, specimens of other forms and shapes may also be subjected to flaw determination tests by the here disclosed method of exciting the specimen to resonant frequency vibration at amplitudes sufficiently intense to reflect specimen flaws, measuring the "sonic test coefficient" under these conditions and comparing the observed value with standards established for specimens of the same form and material.

Our inventive improvements are therefore extensive in their adaption and are not to be restricted to the specific form here disclosed by way of illustration.

We claim:

1. In a method of testing metal for the presence of defects, the steps which comprise exciting a specimen of said metal to longitudinal vibration, adjusting the frequency of this longitudinal vibration to the specimen's natural frequency of resonance, measuring the amplitude of this resonant frequency vibration to indicate the resulting peak stresses which are set up in the specimen metal, intensifying this resonant frequency vibration's amplitude until said indicated peak stresses attain a predeterminedly high value at which a defective-metal specimen exhibits a damping capacity sharply differing from that of a sound-metal specimen, and measuring said damping capacity at the so intensified amplitude of vibration whereby to determine whether the metal of said tested specimen is sound or is defective.

2. In a method of testing a cylindrical specimen of cartridge case brass for the presence of defects, the steps which comprise exciting said specimen to longitudinal vibration, adjusting the frequency of this longitudinal vibration to the specimen's natural frequency of resonance, measuring the amplitude of this resonant frequency vibration to indicate the resulting peak stresses which are set up in the specimen brass, intensifying this resonant frequency vibration's amplitude until said indicated peak stresses attain high values typified by several thousand pounds per square inch and at which a defective-brass specimen exhibits a damping capacity substantially different from that of a sound-brass specimen, and measuring the damping capacity of said tested specimen at said high stress producing amplitude for purposes of classifying the brass thereof either as sound or as defective to an observed degree.

3. In a method of testing metal for the presence of defects, the steps which comprise inducing in a specimen of said metal mechanical forces which repeatedly reverse themselves and by which said specimen is excited to longitudinal vibration, adjusting the frequency of this vibration to the specimen's natural frequency of resonance, measuring the amplitude of this resonant frequency vibration to indicate the resulting peak stresses which are set up in the specimen metal, intensifying this resonant frequency vibration's amplitude until said indicated peak stresses attain a given high value at which a defective-metal specimen exhibits a damping capacity sharply differing from that of a sound-metal specimen, and measuring the energy that is required to produce said given-stress-valve amplitude of resonant vibration whereby to indicate the relative damping capacity of the specimen and therefrom to determine whether the metal of said specimen is sound or is defective.

4. In a method of testing metal for the presence of defects, the steps which comprise electrically inducing in a specimen of said metal mechanical forces which repeatedly reverse themselves and by which said specimen is excited to longitudinal vibration, adjusting the frequency of this vibration to the specimen's natural frequency of resonance, measuring the amplitude of this resonant frequency vibration and the resulting peak stresses which are set up in the specimen metal, intensifying this resonant frequency vibration's amplitude until said measured peak stresses attain a given high value at which a defective-metal specimen exhibits a damping capacity substantially differing from that of a sound-metal specimen, measuring the electrical energy that is required to produce the intensified amplitude vibration by which said given high value of measured peak stress is yielded, and dividing said given-value stress measurement into said electrical energy measurement whereby to indicate the relative damping capacity of the specimen for purposes of classifying the metal thereof either as sound or as a defective to an observed degree.

THOMAS A. READ.
HERBERT I. FUSFELD.
SUMNER W. KITCHEN.